United States Patent
Clevelario et al.

(10) Patent No.: US 9,574,690 B2
(45) Date of Patent: Feb. 21, 2017

(54) SLEEVE MEMBER, END FITTING ASSEMBLY AND METHOD OF ASSEMBLY OF FLEXIBLE PIPE

(71) Applicant: GE Oil & Gas UK Limited, Nailsea, Bristol (GB)

(72) Inventors: Judimar de Assis Clevelario, Rio de Janeiro (BR); Fabio de Souza Pires, Rio de Janeiro (BR); Felipe Areas Vargas, Niteroi (BR); Valdeir Tinoco da Silva, Rio de Janeiro (BR)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 90 days.

(21) Appl. No.: 14/411,022

(22) PCT Filed: Jun. 24, 2013

(86) PCT No.: PCT/EP2013/063105
§ 371 (c)(1),
(2) Date: Dec. 23, 2014

(87) PCT Pub. No.: WO2014/001238
PCT Pub. Date: Jan. 3, 2014

(65) Prior Publication Data
US 2015/0192232 A1     Jul. 9, 2015

(30) Foreign Application Priority Data

Jun. 26, 2012  (EP) ..................................... 12173647
Mar. 5, 2013   (EP) ..................................... 13157786

(51) Int. Cl.
*F16L 33/01*     (2006.01)
*G01M 3/28*      (2006.01)

(52) U.S. Cl.
CPC ............ *F16L 33/01* (2013.01); *G01M 3/2853* (2013.01); *F16L 2201/30* (2013.01); *Y10T 29/49826* (2015.01)

(58) Field of Classification Search
CPC ............ F16L 9/147; F16L 9/17; F16L 11/042; F16L 21/007; F16L 21/065; F16L 23/02; F16L 23/032; F16L 23/036; F16L 23/125; F16L 33/01; F16L 58/187; F16L 2201/30; G01M 3/2853; Y10T 29/49826
(Continued)

(56) References Cited

U.S. PATENT DOCUMENTS 3,051,513 A * 8/1962 Watts .................. E21B 33/0422
                                                  24/463
3,645,563 A * 2/1972 Rochelle ................. F16L 23/02
                                                  285/24
(Continued)

FOREIGN PATENT DOCUMENTS

DE     2623142 A1    11/1977
EP     1867907 A1    12/2007

OTHER PUBLICATIONS

International Search Report and Written Opinion of the International Searching Authority, mailed Oct. 28, 2013, for corresponding International Application No. PCT/EP2013/063105, 9 pages.

*Primary Examiner* — Brent W Herring
(74) *Attorney, Agent, or Firm* — Klarquist Sparkman, LLP

(57) ABSTRACT

A sleeve member, end fitting assembly, and a method of assembly of a flexible pipe are disclosed. The sleeve member includes a body comprising a substantially cylindrical portion having an inner diameter substantially equal to an outside diameter of a first pipe body layer for overlying the first pipe body layer; and a flange portion extending radially outwards from the body for locating between a further pipe
(Continued)

Figure 1:
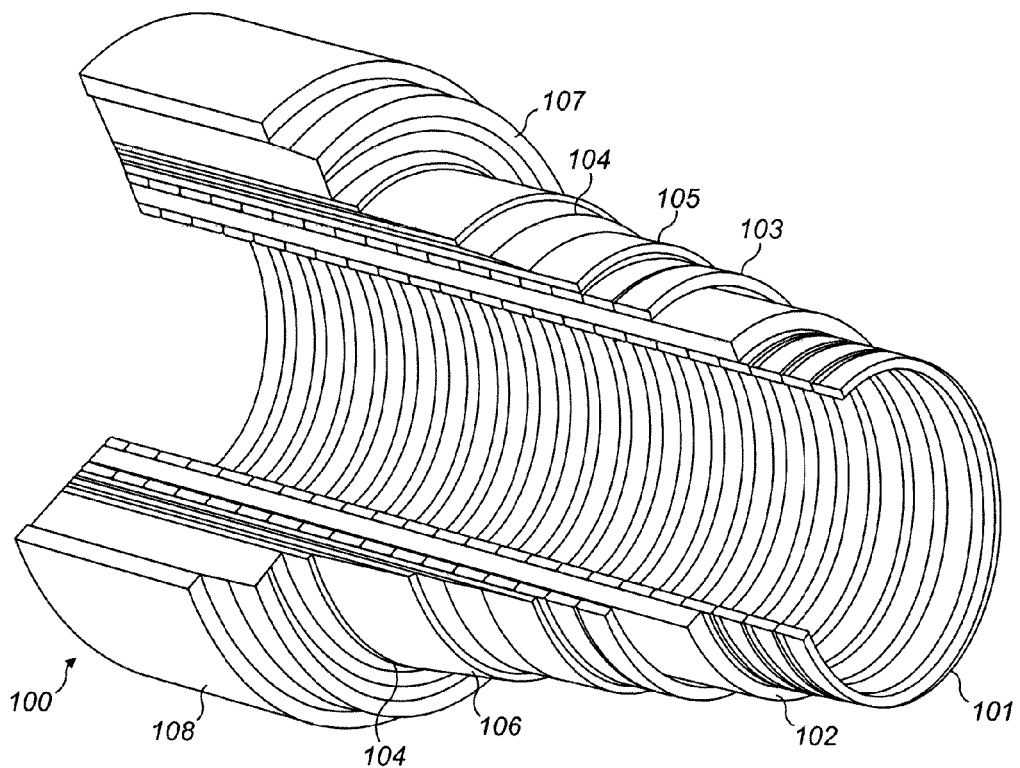

body layer and an end fitting, the further pipe body layer being an armor layer, the flange portion having an outer diameter substantially equal to or greater than the outer diameter of the further pipe body layer.

12 Claims, 6 Drawing Sheets

(58) Field of Classification Search
USPC .................................. 285/222.1, 222.5, 223
See application file for complete search history.

(56) References Cited

U.S. PATENT DOCUMENTS

| | | | |
|---|---|---|---|
| 3,874,064 A | 4/1975 | Chevalier | |
| 4,033,612 A * | 7/1977 | Chevalier | F16L 11/083 285/222.4 |
| 4,416,473 A * | 11/1983 | Lamy | F16L 27/103 285/223 |
| 5,207,459 A * | 5/1993 | Glover | F16L 19/075 285/148.13 |
| 5,244,237 A * | 9/1993 | Harvey | F16L 58/187 285/242 |
| 6,592,153 B1 * | 7/2003 | Belcher | F16L 33/01 277/607 |
| 6,923,477 B2 | 8/2005 | Buon et al. | |
| 7,175,208 B2 * | 2/2007 | Belcher | F16L 21/04 285/222.2 |
| 8,104,797 B2 * | 1/2012 | Eccleston | F16L 33/01 285/222.1 |
| 8,112,863 B2 * | 2/2012 | Eccleston | F16L 33/01 285/222.4 |
| 8,499,799 B2 * | 8/2013 | Saltel | F16L 33/01 138/109 |
| 9,217,526 B2 * | 12/2015 | Eccleston | F16L 11/12 |
| 2004/0066035 A1 * | 4/2004 | Buon | F16L 33/003 285/222.2 |
| 2011/0100499 A1 * | 5/2011 | Saltel | F16L 33/01 138/137 |
| 2012/0043755 A1 * | 2/2012 | Van Ryzin | F16L 23/024 285/294.1 |
| 2014/0013829 A1 * | 1/2014 | Demanze | G01M 3/283 73/49.1 |
| 2014/0312612 A1 * | 10/2014 | Dhagat | F16L 33/01 285/245 |
| 2015/0292663 A1 * | 10/2015 | Glejbol | F16L 33/01 285/255 |

* cited by examiner

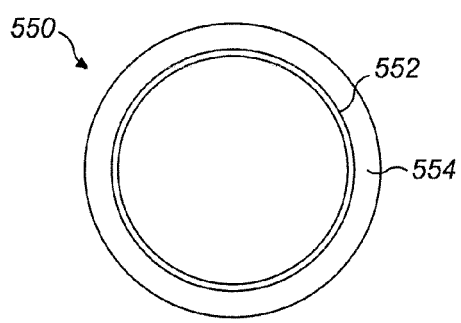
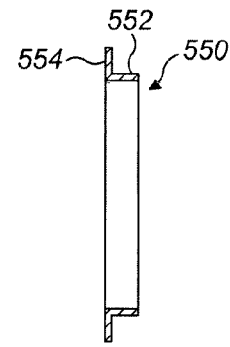
FIG. 12a  FIG. 12b
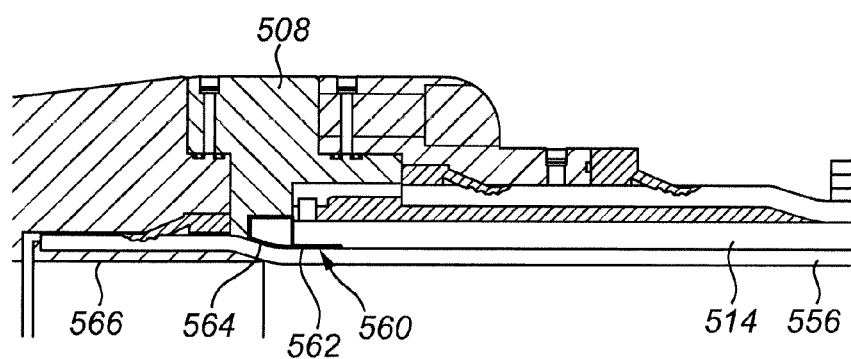
FIG. 13

SLEEVE MEMBER, END FITTING ASSEMBLY AND METHOD OF ASSEMBLY OF FLEXIBLE PIPE

CROSS REFERENCE TO RELATED APPLICATIONS

This is the U.S. National Stage of International Application No. PCT/EP2013/063105, filed Jun. 24, 2013, which in turn claims priority to and the benefit of European Patent Application Nos. EP13157786.8, filed Mar. 5, 2013 and EP12173647.4, filed Jun. 26, 2012.

The present invention relates to a sleeve member, an end fitting assembly, and a method of assembly of a flexible pipe. In particular, but not exclusively, the present invention relates to a sleeve member for use in a flexible pipe in the region where a flexible pipe body is terminated in an end fitting.

The present invention also relates to the intermediate sealing for ultra-deep water applications. In particular, but not exclusively, the present invention relates to fluid sealing systems provided in end fittings of flexible pipes, including the seal configuration and the testing thereof.

Traditionally flexible pipe is utilised to transport production fluids, such as oil and/or gas and/or water, from one location to another. Flexible pipe is particularly useful in connecting a sub-sea location (which may be deep underwater, say 1000 meters or more) to a sea level location. The pipe may have an internal diameter of typically up to around 0.6 meters. Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including metallic and polymer layers.

Unbonded flexible pipe has been used for deep water (less than 3,300 feet (1,005.84 meters)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. As a result the need for high levels of performance from the layers of the flexible pipe body and the connections of pipe body layers with end fittings is increased.

A flexible pipe is an assembly of a portion of a pipe body and one or more end fittings in each of which a respective end of the pipe body is terminated. FIG. 1 illustrates how pipe body 100 may formed from a combination of layered materials that form a pressure-containing conduit. Although a number of particular layers are illustrated in FIG. 1, pipe body structures may include two or more coaxial layers manufactured from a variety of possible materials. The layer thicknesses are shown for illustrative purposes only.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. Pipe body may be used without a carcass layer (i.e. smooth bore) or with a carcass (rough bore). The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (smooth bore operation) the internal pressure sheath may be referred to as a liner.

Figure 8:
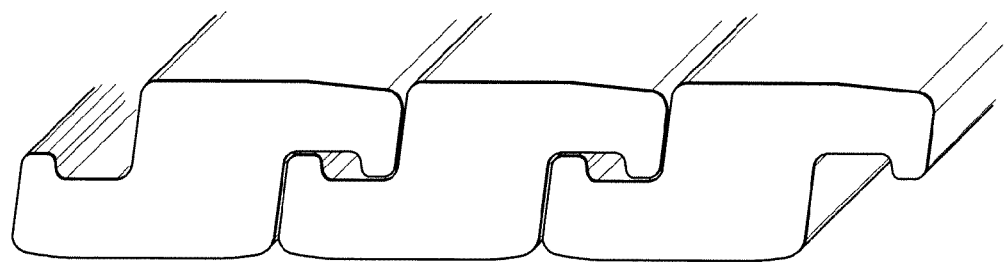

An optional pressure armour layer 103 is a structural layer with a lay angle close to 90° that increases the resistance of the flexible pipe to internal and external pressure and mechanical crushing loads. The layer also structurally supports the internal pressure sheath, and typically consists of an interlocked construction. Pressure armour layers often have wound wires with a specific cross section profile to interlock so as to be able to maintain and absorb radial forces resulting from outer or inner pressure on the pipe. The cross sectional profile of the wound wires which prevent the pipe from collapsing or bursting as a result of pressure are sometimes called pressure-resistant profiles. EP1141606, U.S. Pat. No. 6,739,355, U.S. Pat. No. 6,283,161, U.S. Pat. No. 6,065,501, WO2008/023110, EP1135623 and EP1395769 disclose flexible pipe body having wound wires for the pressure armour layer, the wires having various cross-sectional profiles. For example, a section through a known pressure armour layer formed of wound wires with a cross sectional profile having a substantially "Z" shaped profile is shown in FIG. 8.

The flexible pipe body also includes an optional first tensile armour layer 105 and optional second tensile armour layer 106. Each tensile armour layer is a structural layer with a lay angle typically between 10° and 55°. Each layer is used to sustain tensile loads and internal pressure. The tensile armour layers are often counter-wound in pairs. The flexible pipe body shown also includes optional layers of tape 104 which help contain underlying layers and to some extent prevent abrasion between adjacent layers.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
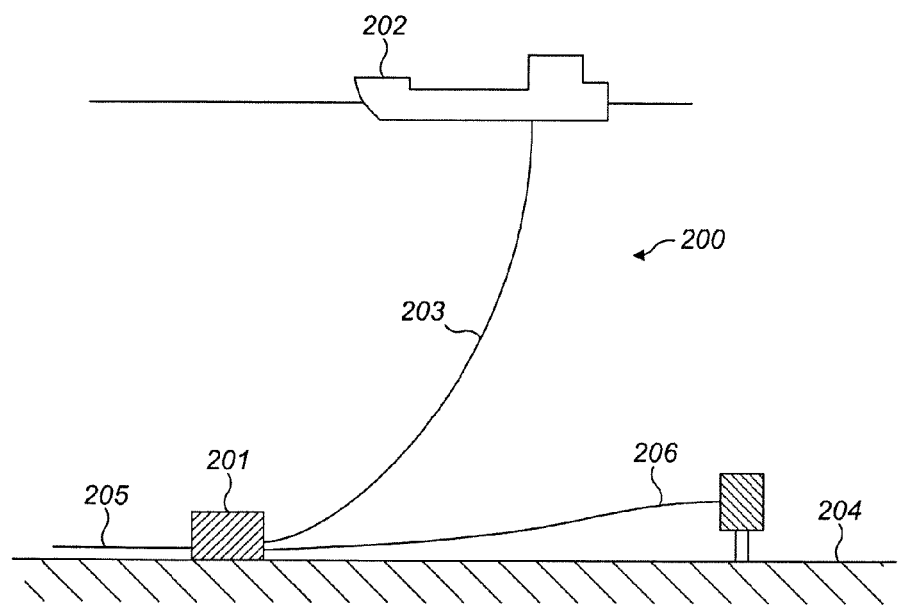

The end fittings of a flexible pipe may be used for connecting segments of flexible pipe body together or for connecting them to terminal equipment such as a rigid sub-sea structures or floating facilities. As such, amongst other varied uses, flexible pipe can be used to provide a riser assembly for transporting fluids from a sub-sea flow line to a floating structure. In such a riser assembly a first segment of flexible pipe may be connected to one or more further segments of flexible pipe. Each segment of flexible pipe includes at least one end fitting. FIG. 2 illustrates a riser assembly 200 suitable for transporting production fluid such as oil and/or gas and/or water from a sub-sea location 201 to a floating facility 202.

Figure 3:
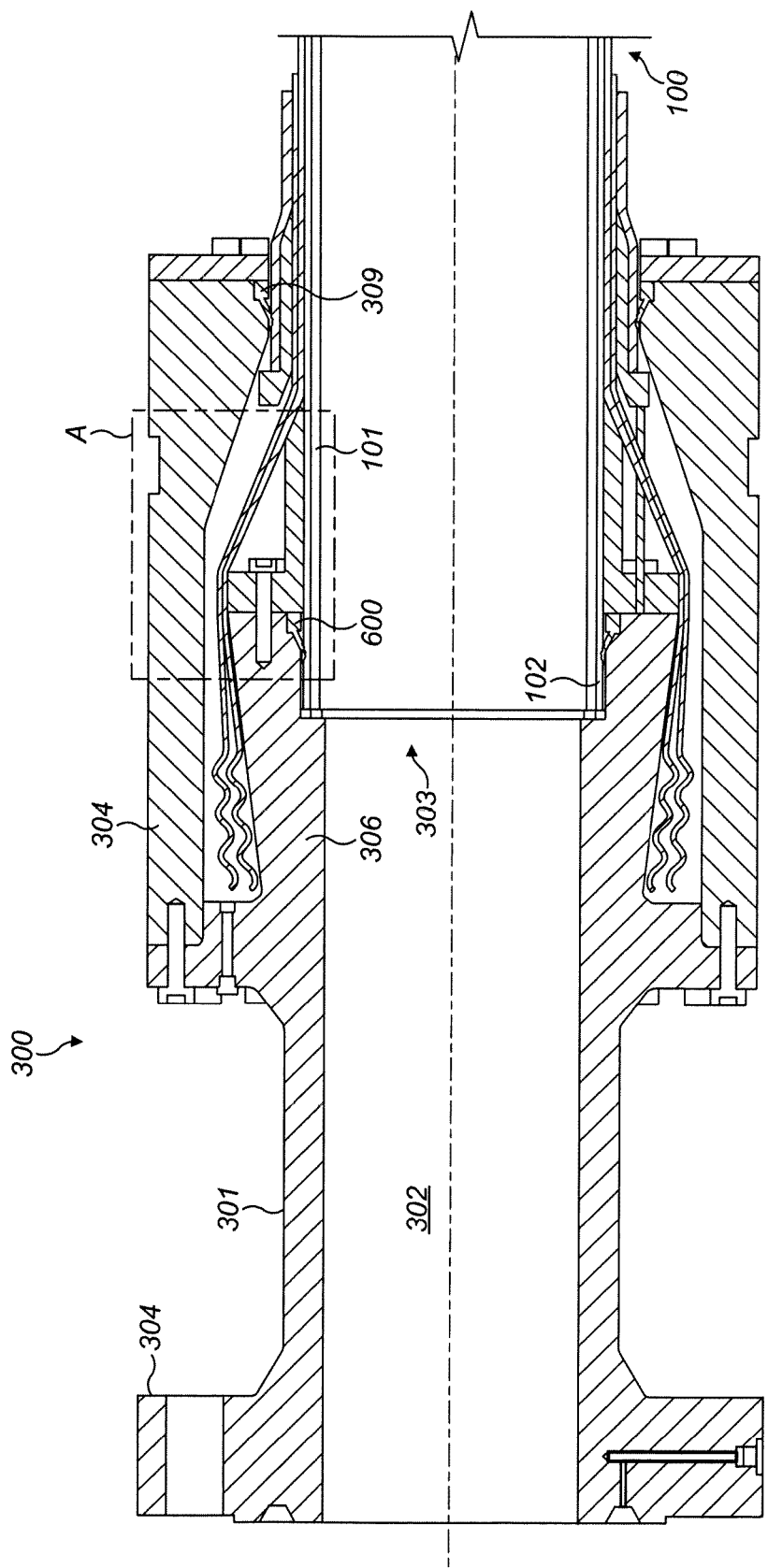

A cross-section of a known end fitting assembly 300, such as disclosed in WO2007/144552 or EP1867907, is shown in FIG. 3. The end fitting 300 includes an end fitting body 301, which includes an internal bore 302 running along its length. The end fitting body is made from steel or other such rigid material. At a first end of the end fitting body 301 there is defined an open mouth region 303 into which an end of a segment of flexible pipe body 100 is located and then terminated. At a further end of the end fitting body 301 is a connector 304. This is formed as a substantially disk-like flared region on the end fitting body. The connector can be connected directly to a matching connector of a further end fitting body of an adjacent segment of flexible pipe body. This can be done using bolts or some other form of securing mechanism. In such a configuration the end fittings would be located in a back-to-back configuration. Alternatively the connector 304 may be connected to a floating or stationary structure such as a ship, platform or other such structure. Various layers of flexible pipe body are introduced to the end fitting assembly, cut to appropriate length, and sealingly engaged with a particular portion of the end fitting.

There are varied problems associated with the provision of end fittings for ends of flexible pipe body. The end fittings must ensure both good fastening and good sealing. In particular, inner seal ring 600 and outer sealing ring 309 may be provided to seal between an adjacent layer of flexible pipe body and the end fitting. A seal is formed by a swaging action, which causes deformation of the sealing ring and/or adjacent layer of pipe body, and compression of the layer of pipe body, which may be of polymer, for example. End fittings vary in design so as to accommodate different variants of flexible pipe body. Certain end fitting designs may include a further sealing ring such as an intermediate sealing ring, which may be used to form a seal between an intermediate sheath layer of a flexible pipe body and the end fitting. Some known arrangements may have an increased risk of leaking as they cannot easily or reliably be tested during the assembly/fabrication stage of attaching the end fitting to the pipe body, so it cannot be known how effective such seals are.

To date, the testing of verification of sealing systems during assembly of the end fittings on the pipe body may be insufficient to prove integrity in service when the pipe is pressurised. This is because the materials used in the construction of the end fitting elements exhibit elastic material behaviour when subjected to loading, for instance when the pipe is pressurised. The amount of elastic movement/displacement of components will be determined from the pressure in the pipe and the material properties of the components. For example, sealed joints which rely on threaded fastener systems for their make-up forces and consequently their sealing integrity will require a high pre-loading of the fasteners during assembly to ensure that the compression force in the seal, required to maintain the seal integrity, are dominant even as the applied pressure in the pipe tries to separate the joint.

Figure 4:
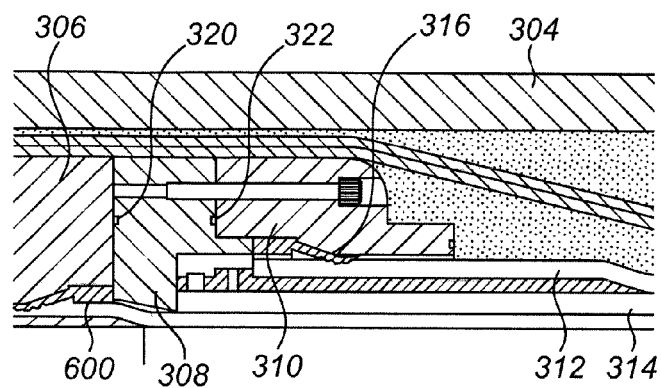

FIG. 4 shows a variation on the arrangement shown in box A of FIG. 3. The arrangement shown includes an end fitting jacket 304, end fitting body 306, and inner sealing ring 600, as per FIG. 3. However, the assembly also includes a first collar member 308 and a second collar member 310 provided to terminate an intermediate sealing layer 312 of the pipe body. The intermediate sealing layer may be provided radially outwards of a pressure armour layer 314 and used to seal the pressure armour layer.

The assembly also includes an additional sealing ring 316 which is known as an intermediate sealing ring, because it seals against an intermediate sealing layer of the pipe body. In addition, the assembly includes O-rings 320, 322 to help block a potential leak pathway along the edges of the first collar member 308.

It will be known that O-rings are often used for efficient sealing however the location and performance of O-ring seals is very dependent upon the properties and performance of the materials around them. The compression forces on either side of an O-ring seal arrangement are critical to the maintenance of a seal. The ability to prove the performance of a sealing system into service is difficult as it is not possible to perform a test on the known configurations as shown in FIG. 4 when the pipe is pressurised.

It has previously been impossible to test the integrity of the O-rings 320, 322 and sealing ring 316 in this arrangement. In addition there may be issues locating the O-rings correctly, and under high pressures when elastic flexing of some of the components takes place the compression force on these O-rings, required to maintain their seal integrity, may diminish or even be lost.

Another problem associated with the provision of end fittings for ends of flexible pipe body is that it can be difficult to cut certain layers of the pipe body that have a non-uniform nature to give a suitably straight end face for abutting with a portion of the end fitting. Armour layers of a flexible pipe body such as pressure armour and tensile armour layers often have a non-uniform nature. For example, for a pressure armour layer having a cross sectional profile as shown in FIG. 8, with helically wound wires (at a non-zero angle), it may be difficult to form a precise cut at 90 degrees to the longitudinal axis of the pipe body.

As such, the cut end of the pressure armour layer (or other non-uniform layer) may not tightly abut with the end fitting, leading to a less than ideal connection between the flexible pipe body and the end fitting.

According to a first aspect of the present invention there is provided a sleeve element for a flexible pipe comprising:
  a body comprising a substantially cylindrical portion having an inner diameter substantially equal to an outside diameter of a first pipe body layer for overlying the first pipe body layer; and
  a flange portion extending radially outwards from the body for locating between a further pipe body layer and an end fitting, the further pipe body layer being an armour layer, the flange portion having an outer diameter substantially equal to or greater than the outer diameter of the further pipe body layer.

According to a second aspect of the present invention there is provided an end fitting assembly comprising an annular member and a sleeve element for locating between the annular member and one or more layers of flexible pipe body.

According to a third aspect of the present invention there is provided a flexible pipe comprising a flexible pipe body and at least one end fitting.

According to a fourth aspect of the present invention there is provided a method of assembling a flexible pipe, comprising:
  providing a sleeve element comprising a body having a substantially cylindrical portion with an inner diameter substantially equal to an outside diameter of a first pipe body layer and a flange portion extending radially outwards from the body, the flange portion having an outer diameter substantially equal to or greater than an outer diameter of a further pipe body layer, the further pipe body layer being an armour layer;

locating the body over a portion of the first pipe body layer and at least partially under the armour layer;

locating the flange portion against an end fitting; and connecting the first and further pipe body layers with the end fitting.

According to a fifth aspect of the present invention there is provided a sleeve member substantially as herein described with reference to the drawings.

According to a sixth aspect of the present invention there is provided an end fitting substantially as herein described with reference to the drawings.

According to a seventh aspect of the present invention there is provided a method substantially as herein described with reference to the drawings.

Certain embodiments of the present invention provide the advantage that a gap between a layer of flexible pipe body and an end fitting (which may be a result of a sub-optimal cut of the layer) may be bridged to prevent an underlying layer creeping into that gap. Certain embodiments of the invention provide the advantage that an assembly is provided in which a higher degree of certainty about the quality of the join between an end fitting and a flexible pipe body can be gained.

Certain embodiments provide the advantage that a sealing system is provided that has improved reliability to known arrangements. Certain embodiments provide a method of testing the sealing integrity of a sealing element in a flexible pipe prior to deployment. As such, the lifetime of the flexible pipe may be more accurately forecast.

Figure 5:
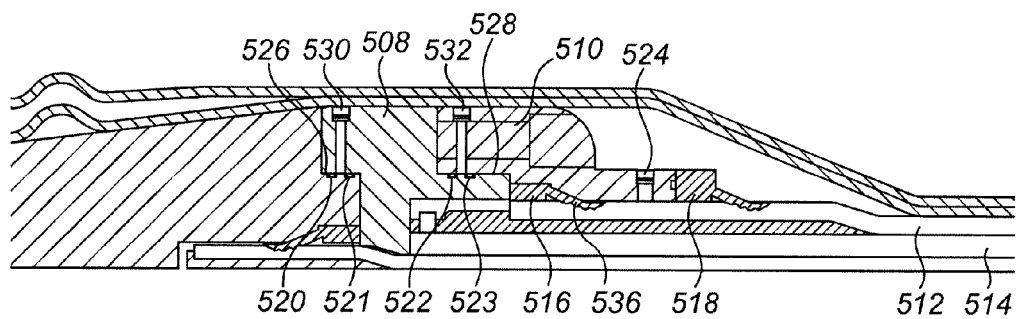
Figure 6:
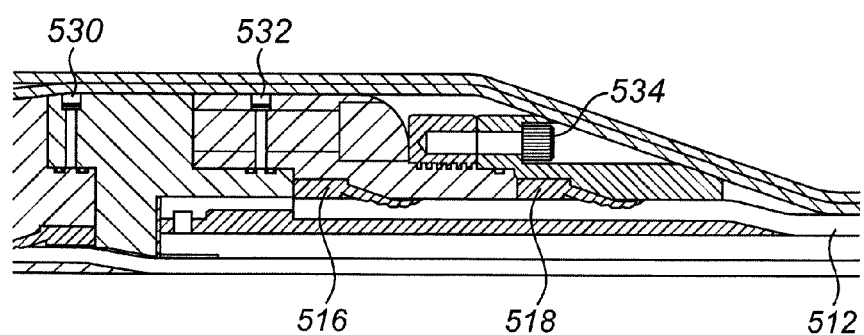
Figure 7:
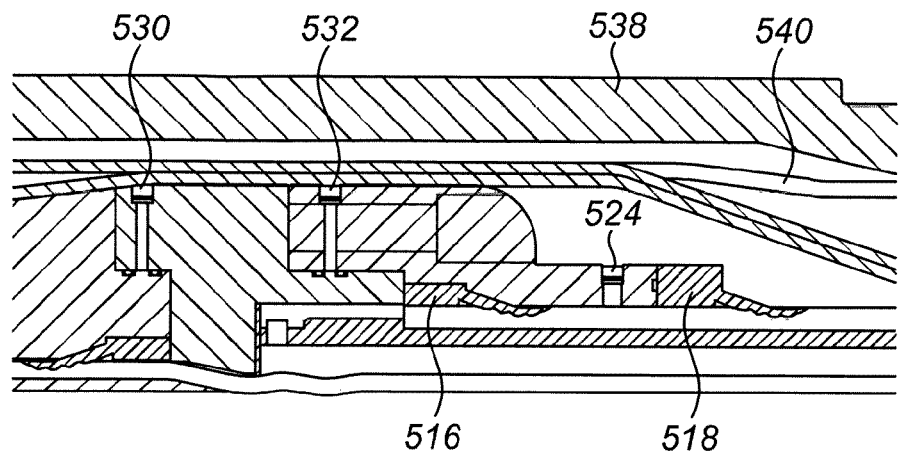
Figure 9:
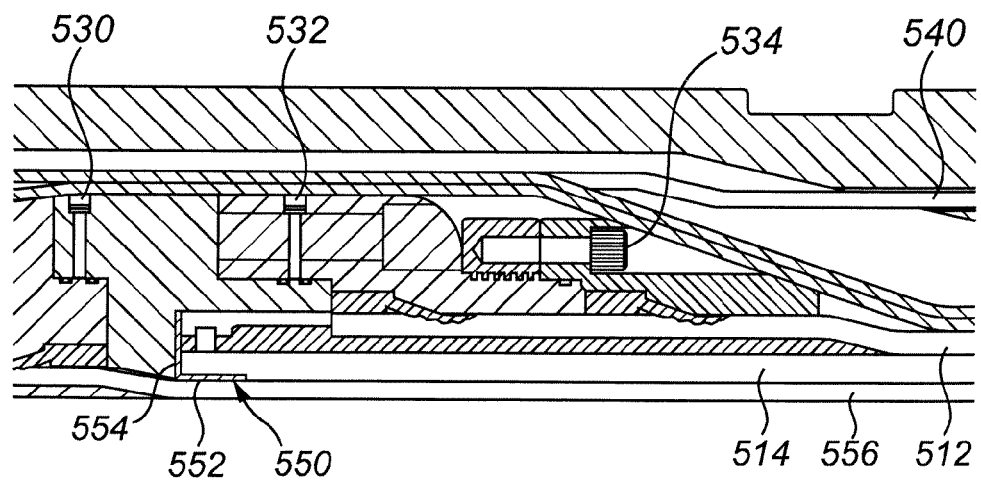
Figure 10:
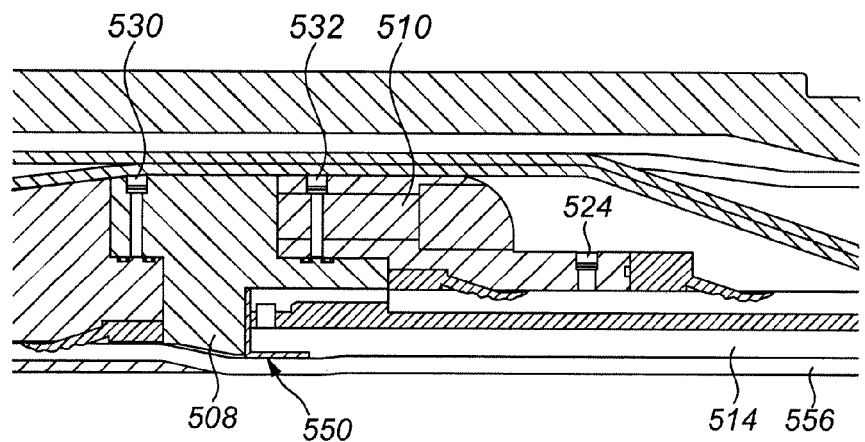
Figure 11:
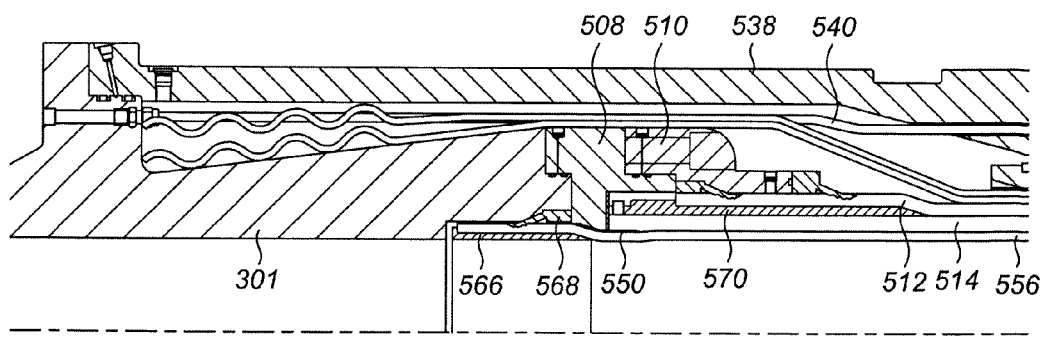

Embodiments of the invention are further described hereinafter with reference to the accompanying drawings, in which:

FIG. 1 illustrates a flexible pipe body;
FIG. 2 illustrates a riser assembly;
FIG. 3 illustrates an end fitting;
FIG. 4 illustrates a variation on the end fitting design;
FIG. 5 illustrates a portion of an end fitting assembly;
FIG. 6 illustrates the portion of FIG. 5 during assembly;
FIG. 7 illustrates the portion of FIG. 5 after further assembly;
FIG. 8 illustrates windings of a known pressure armour layer;
FIG. 9 shows a slightly enlarged view of the portion of end fitting assembly shown in FIG. 6 and a portion of the end fitting jacket;
FIG. 10 shows a slightly enlarged view of the portion shown in FIG. 7;
FIG. 11 illustrates a more complete view of an end fitting assembly, including the portion of FIG. 10;
FIGS. 12a and 12b illustrate a sleeve element; and
FIG. 13 illustrates an alternative arrangement to that shown in FIGS. 6, 7 and 9 to 11.

In the drawings like reference numerals refer to like parts.

FIG. 5 illustrates a cross-section of a portion of a sealing arrangement of an end fitting. The assembly includes a first collar member 508 and a second collar member 510 provided to terminate an intermediate sealing layer 512 of the pipe body. The intermediate sealing layer may be provided radially outwards of a pressure armour layer 514 and used to seal the pressure armour layer.

The assembly also includes intermediate sealing rings 516, 518 for blocking a potential leak pathway along the radially outer face of the intermediate sealing layer 512 and the first collar member 508. The first sealing ring is provided between the first collar member and the second collar member, and over a portion of the intermediate sealing layer 512. The second sealing ring is provided at an opposite side of the second collar member 510 and over a portion of the intermediate sealing layer 512. As such, in this example the first and second sealing rings have the same diameter (and radius). Between the sealing rings 516, 518 is a test port 524 provided in the second collar member 510, extending as a passageway from a radially outer surface of the second collar member to a radially inner surface of the collar member.

In addition, the assembly includes two pairs of O-rings 520, 521, 522, 523 to help block a potential leak pathway along the edges of the first collar member 508. The O-rings are coaxial and provided along surfaces 526, 528 of the first collar member 508 that extend around circumferential axes of the flexible pipe. In this example, the O-rings 520 and 521 have the same diameter, and the O-rings 522 and 523 have the same diameter. Between the O-rings 520, 521 is a test port 530 provided in the first collar member 508, extending as a passageway from a radially outer surface of the first collar member to a radially inner surface of the collar member. Between the O-rings 522, 523 is a test port 532 provided in the first collar member 508, extending as a passageway from a radially outer surface of the first collar member to a radially inner surface of the collar member.

To provide a good seal, a sealing ring should be energised by a swaging action. This involves the two adjacent elements, in the case of the sealing ring 516, the first collar member 508 and second collar member 510, being brought together (in either direction or simultaneously) until further movement is restricted. Then, the adjacent elements are brought closer together, which is likely to deform the wedge-like portion of the sealing ring 536 and urge the wedge-like portion into a close sealing configuration with the pipe layer below (intermediate sheath 512). The pipe layer may also deform somewhat.

As shown in FIG. 6, to energise the sealing rings 516, 518, a swaging tool 534 is used, which is forced in a direction from right to left in the figure shown. Of course the collar members could alternatively be forced towards a stationary swaging tool, or all elements urged simultaneously together. This action energises both sealing rings as described above.

With the sealing rings in place and forming a seal, the test port 524 may be used to test the integrity of the sealing rings. In a testing mode, a fluid (e.g. water) may be introduced into the port 524 to pressurise the region between the two sealing rings. The pressure introduced may aptly be 2 MPa, or more. The pressure may be predetermined to simulate the hydrostatic pressure experienced under the sea in use. Certain arrangements may warrant testing to 5 MPa, or up to 50 MPa.

With this arrangement, the joints between the sealing rings 516, 518 and the intermediate sealing layer 512 will receive pressurised fluid. Upon reaching a pressurized state, this region should not see a fall in pressure over the test period, due to the first and second sealing rings 516, 518. The region may be pressurised for a predetermined period, for example 5 minutes, or up to 2 hours or more. The period of testing will become less useful if pressure is held for many hours, as fluid may begin to permeate the polymer sheath 512.

If the apparatus gives no indication of a leakage or failure, as signified by a drop in pressure, then the integrity of the seal 516 may be confirmed.

In addition to this test, a similar type of pressure test may be performed to test the pair of O-rings 520,521 using the test port 530. Furthermore, a similar type of pressure test may be performed to test the pair of O-rings 522, 523 using the test port 532. This test on the O-rings effectively provides proof of integrity of those seals not only during the assembly process, but also when the pipe is pressurised, as their location and configuration ensures the performance of the seal is not diminished or lost as a result of the elastic behaviour of threaded fasteners holding a connection together, as would have been the case with previous designs.

Aptly, the O-ring pairs may be tested to a pressure of around 0.2 MPa.

Upon testing of the sealing ring 516 and O-rings 520, 521, 522, 523 with a positive result (i.e. the seals maintain their integrity under the applied pressure), the pressure may be removed, the ports closed, and the flexible pipe construction may be completed ready for use. The sealing ring 518 becomes effectively redundant, its only use being as part of the testing arrangement.

FIG. 7 shows the arrangement after the additional parts of the end fitting have been applied, including an end fitting jacket 538 and a gas venting passageway 540. The remainder of the end fitting arrangement (not shown) may be provided in a known manner.

Various modifications to the detailed designs as described above are possible. For example, rather than a swaging tool, other arrangements may be used to energise the sealing rings. For example, a bolt may be used that is driven into the second collar member towards the first collar member and tightened to a degree that swages the sealing rings.

The sealing arrangement need not be designed to test an intermediate seal. A similar arrangement may be used to test a seal adjacent an outer collar member against an end fitting jacket, for example. Various layers and combinations of layers may be used, depending upon the required conditions of the flexible pipe.

With the above-described arrangement, it is possible to test the reliability of a sealing element to be used in a flexible pipe to be used at great depths under the sea, such as 1000 m or more and/or operating at high pressure. It is particularly useful to be able to have a high degree of confidence in the performance of a sealing element, because it is impossible to replace a faulty sealing element after deployment into the sea without completely re-terminating the pipe, which involves removing the pipe from its in-use location, removing the end fitting including the faulty sealing element, and re-fitting a new end fitting arrangement, before reuse of the pipe is possible.

By forming a chamber between a first and second sealing element, high pressure can be applied to test the integrity of at least one of the sealing elements required, yet without subjecting the remainder of the pipe to that high pressure. As such, the high pressure is applied only at the point of the pipe to be tested.

With the above-described invention, a sealing element may be tested during construction of a flexible pipe to ensure its sealing integrity prior to deployment of the flexible pipe.

For certain flexible pipe body arrangements, it is useful to provide a sealing layer (an intermediate seal) over the pressure armour layer. Then the pressure armour layer and a carcass layer may both be used to give pressure resistance to the pipe. With this invention, it can be assured that the pressure armour layer will not be flooded by hydrostatic pressure from the surrounding sea. As such, the performance of the pressure armour layers can be relied upon as part of the pressure (pipe collapse) resisting layers for ultradeep water applications.

FIG. 6 additionally shows a further inventive feature of the arrangement disclosed, which will be described below with reference to FIGS. 6 to 12. As mentioned above, the cut end of a pipe body layer, particularly non-uniform layers such as a pressure armour layer, may not tightly abut with the end fitting, leading to a less than ideal connection between the flexible pipe body and the end fitting.

One way the inventors have found to address this problem has been to fill any gap between the cut end of the pressure armour layer (or other non-uniform layer) and the end fitting with a filler material for example a two-part epoxy resin (for example, a gap between a pressure armour layer end and a collar of an end fitting). However, epoxy resin may compress under pressure, thus changing the volume of the void it fills and possibly affecting surrounding areas. Also, after construction, it is not possible to confirm whether a void into which epoxy has been injected has been entirely filled, thus leaving doubt as to the final quality of the arrangement.

The present inventors have found a further problem in that any gap between a pipe body layer and an end fitting is likely to allow a radially inner layer, such as a polymer barrier layer, to extrude into that gap, causing the inner layer to have uneven finish and possible microcrazing of a polymer, ultimately leading to possible failure of the pipe body. In addition, with a layer having an uneven end cut, the gap between the layer and the end fitting may vary in size around the circumference of the pipe layer, leading to a correspondingly uneven radially inner layer.

As shown in FIGS. 6 (and 9, 10, 11, 12a and 12b), a sleeve element 550 is provided at a juncture between the flexible pipe body and the end fitting. The sleeve element 550 includes a body 552 having a substantially cylindrical portion, and a flange portion 554 extending radially outwards from the body 552. As such, the sleeve element of this embodiment is generally circular in one cross section (see the end view shown in FIG. 12a), with another cross section through the body and flange portion being substantially L shaped (as can be seen in FIG. 6). FIG. 12b shows a cut through view of the sleeve element 550 from a side perpendicular to the view shown in FIG. 12a.

The sleeve element is provided to lie over, i.e. radially outwards of, a liner (fluid retaining layer) 556. As such, the inner diameter of the sleeve element body 552, and the sleeve element itself, will be substantially equal to an outside diameter of the liner.

The radially extending flange portion 554 is arranged to lie between the first collar member 508 and an end of the pressure armour layer 514, in this case across the cut end of the armour layer and further outwards beyond the outer diameter of the pressure armour layer.

Here the sleeve element is metallic, for example of carbon or stainless steel. The dimensions of the sleeve element in this embodiment are as follows—body length 25 mm, body width 1 mm, flange length 31 mm, flange width 2 mm. Of course in practice, the sleeve element may have any suitable dimensions to fit with the dimensions of the pipe layers and end fitting parts against which it will be positioned. For example, the body width (thickness) may be between around 0.25 mm to 2 mm, or 0.5 mm to 1.5 mm, or 1 mm to 2 mm, etc. The sleeve element may also be tapered so as to aid its positioning between pipe body layers.

In a method of assembling a flexible pipe, an end fitting such as that shown in FIG. 3 is provided. A liner is located against the end fitting. A sleeve element is located over the liner. A pressure armour layer is located over at least part of the substantially cylindrical portion of the sleeve element.

In more detail (with reference to FIG. 11), firstly a sleeve 570 may be inserted above the pressure armour layer 514 and below the intermediate sealing layer 512 of a pipe body. Then, the sleeve element 550 is inserted underneath (radially inwards of) the pressure armour layer 514, and abuts the radially inner surface of the pressure armour layer. The sleeve element 550 may be urged into position using the inner collar 508. Subsequently, the inner collar 508 is urged into position. The sleeve element 550 is then presented to the face of the inner collar 508, the inner sleeve 566 is then inserted below the liner 556, and a seal 568 is urged into sealing position using the body 301 by bringing the end fitting body 301 towards the pipe body. In such a method where a sleeve element is urged between two pipe body layers, and then abutted against an end fitting, grease may be used to aid the insertion of the body of the sleeve element between the pipe body layers.

Various modifications to the sleeve element as described above are possible. For example, as shown in FIG. 13, a sleeve element 560 is similar to the sleeve element 550, though the flange portion is effectively much thicker and extends into a corresponding cavity in the collar member. As such, the flange portion may be said to include a ring member 564 extending away from the body in an axial and radial direction. The ring member may be integrally formed with the flange and body 562, or may be a separate ring member that is bonded to the flange with adhesive or weldments, or similar. The ring member 564 has an inner diameter corresponding with an inner diameter of the inner collar member 508. As can be seen in this embodiment, the ring member 564 has an inner diameter that gradually increases from an end closest to the body 562 to an opposite end. The ring member 564 also has an outer diameter that corresponds with an outer diameter of the inner collar member 508.

It can be seen from FIG. 13 that the gradually increasing inner diameter of the ring member supports the liner 556 such that the liner extends over an inner sleeve 566 with a corresponding outer diameter that gradually increases. Therefore, the liner is smoothly located against the collar member, supported both at its radially inner and outer surfaces.

Because the shape of the ring member 564 matches the cavity in the collar member 508 into which the sleeve element can be located, this assists in the manufacture of the assembly by enabling the sleeve element to be easily located into a correspondingly shaped space.

With the sleeve element 560 shown in FIG. 13, the flange portion is bonded to the adjacent ring member. Because the ring member is shaped to fit exactly into a corresponding cavity of the collar member 508, it helps to locate the sleeve element at the correct position with respect to the collar member. In addition, any possible gap between the end fitting and the sleeve element would occur to the left (in the drawing) of the ring member, which is over, or radially outwards of, the inner sleeve 566. As such, the radially inner sleeve 566 helps to support the liner 556 at the point where a gap may occur.

Although the sleeve member has been described with a substantially L shaped cross section, the sleeve member may be shaped with other cross sections. For example, the sleeve member may have an inverted T shaped cross section, or other cross section including a body, a flange portion, and other extension(s) to fit against an end fitting.

In some embodiments the sleeve element may be bonded into place so as to fixedly join the pipe body layer to the end fitting. The sleeve element may be bonded to just the end fitting (in this case the collar member), or to the end fitting and a pipe body layer or layers.

Although the sleeve element has been described with a body lying between a fluid retaining layer and an armour layer, there may be further layers therebetween. For example, a wear layer may be present between the liner and the pressure armour layer.

Thus, the body of the sleeve element may be located over the liner and under the wear layer, achieving the same functions as described above.

With the sleeve element described above, a gap between a pipe body layer and an end fitting may be bridged. In particular, a body of the sleeve element lies in a gap between an end of the pressure armour layer and the first collar member, joining the pressure armour layer to the end fitting, thereby preventing an underlying layer from extruding into the gap, which would otherwise damage the underlying layer.

In addition, the flange portion may be positioned against the end fitting, partly filling the gap or completely filling the gap.

Because the body is of a relatively hard material such as metal, i.e. a material that is harder than the underlying pipe body layer, the underlying layer is prevented from extruding into a gap between the end fitting and the radially outer layer.

Because the body lies partly under the pressure armour layer and extends along the gap to meet the end fitting, the body is suitable for blocking (preventing) the liner from extending radially outwards into the gap between the armour layer and end fitting.

Aptly when the flange portion is of a relatively hard material, i.e. harder than the end fitting and pipe body layer between which the flange portion is sandwiched, the sleeve element cannot be compressed to cause misshaping in the end fitting assembly.

In addition, a non-uniformly cut pipe body layer may be terminated in an end fitting without adverse effect on the finished assembly. Aptly the flange portion extends at least across the width of the pipe body layer against which it may abut, thereby containing any untidy finish of the pipe body layer. The flange portion may extend further than the width of the pipe body layer (as shown in FIG. 6 for example).

In some embodiments the pipe body layer may be terminated in an end fitting with a gap therebetween, with a sleeve member having a flange portion abutting the end fitting, and a body lying under the pipe body layer and bridging the gap to the end fitting along an interface with an underlying layer. As such, the sleeve element leaves a gap radially outwards of the body, between the end fitting and pipe body layer, but with no adverse effect on the finished assembly. This is because the interface with the underlying layer is covered to thereby prevent extrusion of that layer, and the pipe layer and end fitting are joined sufficiently.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

Various other embodiments are described in the following numbered paragraphs.

1. A method for testing the integrity of a sealing arrangement of a flexible pipe, comprising:
    locating a first annular sealing element and a second annular sealing element in a joint between two elements of a flexible pipe, with a region of the joint therebetween; and
    pressurising the region between the first sealing element and the second sealing element through a port extending towards the region to a predetermined pressure of about 0.2 MPa or greater.

2. A method as described in paragraph 1 wherein the first sealing element has a diameter equal to the second sealing element.

3. A method as described in paragraph 1 or 2, wherein the first and second sealing elements are O-rings.

4. A method as described in paragraph 2 wherein the two elements of the flexible pipe are a first collar member and an end fitting body.

5. A method as described in paragraph 2 wherein the two elements of the flexible pipe are a first collar member and a second collar member.

6. A method as described in paragraph 1 or 2 wherein the first and second sealing elements are sealing rings.

7. A method as described in paragraph 5 wherein the two elements of the flexible pipe are a first collar member and a second collar member.

8. A method as described in paragraph 5 or 6 wherein the first and second sealing elements are provided adjacent to and radially outwards of a polymer sealing layer of flexible pipe body.

9. A method as described in any of paragraphs 5 to 7 further comprising the step of energising the first and second sealing elements by urging one or both of the two elements of the flexible pipe towards the other element.

10. A method as described in any preceding paragraph wherein the predetermined pressure is about 0.2 to 50 MPa.

11. A method as described in any preceding paragraph further comprising
    locating a third annular sealing element and a fourth annular sealing element in a joint between two elements of a flexible pipe, with a region of the joint therebetween; and
    pressurising the region between the third sealing element and the fourth sealing element through a port extending towards the region to a predetermined pressure of 5 MPa or greater.

12. An assembly for ensuring the integrity of a sealing arrangement of a flexible pipe, comprising:
    a first annular sealing element and a second annular sealing element in a joint between two elements of a flexible pipe, with a region of the joint therebetween; and
    a port extending towards the first sealing element for pressurising the region between the first sealing element and the second sealing element.

13. An assembly as described in paragraph 11 wherein the first sealing element has a diameter equal to the second sealing element.

14. An assembly as described in paragraph 11 or 12 wherein the first and second sealing elements are O-rings or sealing rings.

15. An assembly as described in paragraph 11, 12 or 13 wherein the two elements of the flexible pipe are a first collar member and an end fitting body.

16. An assembly as described in paragraph 11, 12 or 13 wherein the two elements of the flexible pipe are a first collar member and a second collar member.

The invention claimed is:

1. A flexible pipe for transporting fluids from a subsea location, comprising a flexible pipe body and at least one end fitting assembly, wherein the at least one end fitting assembly comprises a collar member and a sleeve element, wherein the sleeve element comprises:
    a body comprising a substantially cylindrical portion having an inner diameter substantially equal to an outside diameter of a first pipe body layer and overlying the first pipe body layer, wherein the body is made of a relatively harder material than the first pipe body layer; and
    a flange portion extending radially outwards from the body and located between a further pipe body layer and the collar member, the further pipe body layer being an armour layer, the flange portion having an outer diameter substantially equal to or greater than the outer diameter of the further pipe body layer;
    wherein the body is positioned relative to the first pipe body layer to prevent the first pipe body layer from extruding into a gap between the collar member and an adjacent end of the armour layer.

2. A flexible pipe as claimed in claim 1 wherein the body of the sleeve element is suitable for blocking the first pipe body layer from extending radially outwards into a gap between the armour layer and the collar member.

3. A flexible pipe as claimed in claim 1 wherein a cross section of the sleeve element is substantially L shaped.

4. A flexible pipe as claimed in claim 1 wherein the collar member is an inner collar member and the flange portion has an inner diameter corresponding with an inner diameter of the inner collar member of the end fitting, and the outer diameter corresponds with an outer diameter of the inner collar member.

5. A flexible pipe as claimed in claim 1 wherein the collar member is an inner collar member and the flange portion of the sleeve element comprises a ring member extending away from the body in an axial and radial direction, the ring member having an inner diameter and an outer diameter each corresponding with an inner diameter and an outer diameter of the inner collar member.

6. A flexible pipe as claimed in claim 5 wherein the ring member has an inner diameter that gradually increases from an end closest to the body to an opposite end.

7. A flexible pipe as claimed in claim 5 wherein the body, the flange portion and the ring member of the sleeve element are integrally formed.

8. A flexible pipe as claimed in claim 1 wherein the first pipe body layer is a fluid retaining layer.

9. A flexible pipe as claimed in claim 1 wherein the body of the sleeve element has a thickness of between about 0.25 mm and about 2 mm.

10. A flexible pipe as claimed in claim 1 wherein the body of the sleeve element has a thickness of between about 0.5 mm and about 1.5 mm.

11. A method of assembling a flexible pipe for transporting fluids from a subsea location, comprising:
- providing a sleeve element comprising a body having a substantially cylindrical portion with an inner diameter substantially equal to an outside diameter of a first pipe body layer and a flange portion extending radially outwards from the body, the flange portion having an outer diameter substantially equal to or greater than an outer diameter of a further pipe body layer, the further pipe body layer being an armour layer;
- locating the body over a portion of the first pipe body layer and at least partially under the armour layer;
- locating and abutting the flange portion against a collar member of an end fitting; and
- connecting the first and further pipe body layers with the end fitting.

12. A method as claimed in claim 11 wherein the flange portion comprises a ring member extending away from the body in an axial and radial direction, the ring member having an inner diameter and an outer diameter each corresponding with an inner diameter and an outer diameter of the collar member of the end fitting.

* * * * *